Jan. 14, 1958 G. H. RENDEL 2,820,004
CURRENT DENSITY INDICATOR AND CONTROL
Filed Aug. 19, 1955
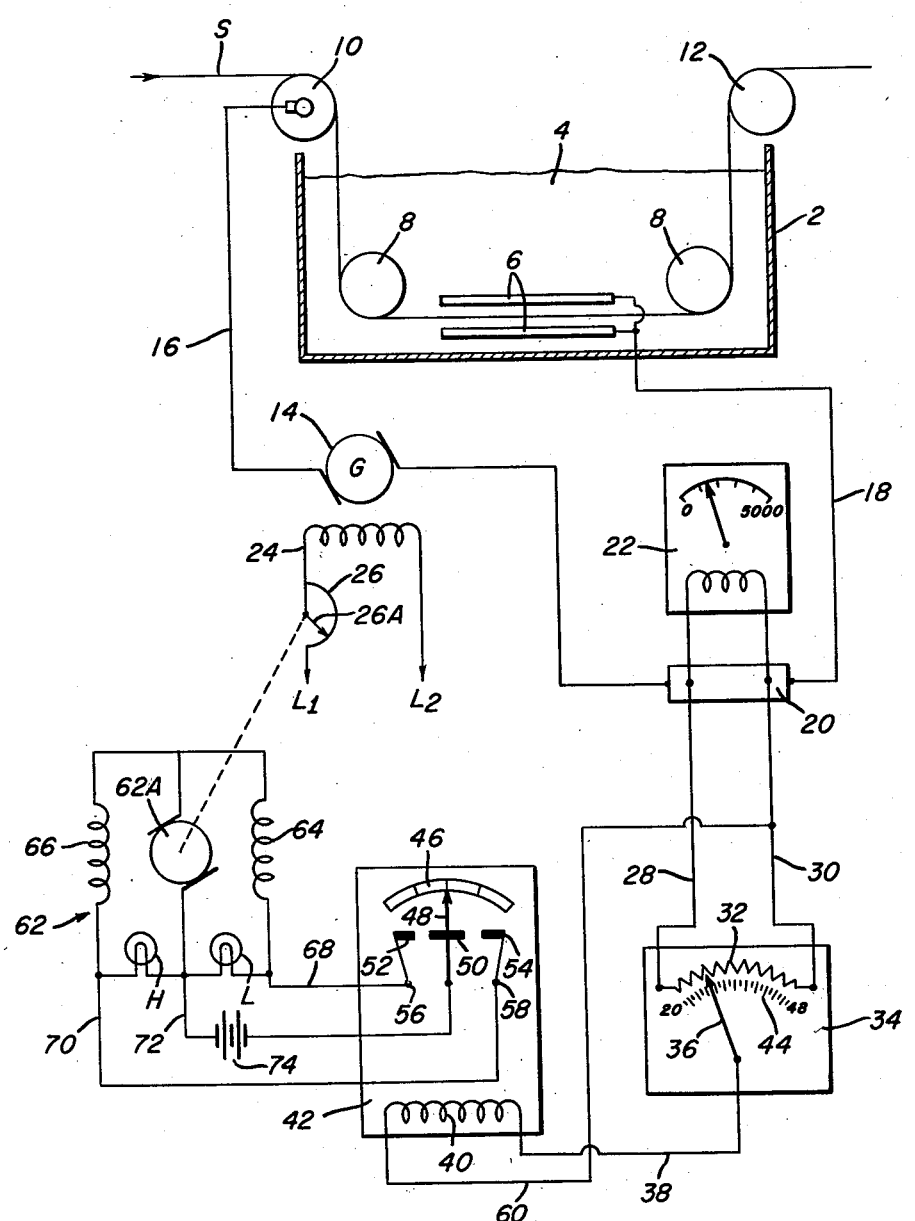
INVENTOR:
GEORGE H. RENDEL,
BY: Donald G. Dalton
his Attorney.

United States Patent Office 2,820,004
Patented Jan. 14, 1958

2,820,004

CURRENT DENSITY INDICATOR AND CONTROL

George H. Rendel, Pittsburgh, Pa., assignor to United States Steel Corporation, a corporation of New Jersey Application August 19, 1955, Serial No. 529,549

2 Claims. (Cl. 204—211)

This invention relates to a current density indicator and control for a continuous strip processing line in which strips of different widths pass through an electrolyte having current supplied thereto. The indicator and control are particularly suitable for those processes in which the current density is of prime importance in obtaining suitable results while the speed of the strip is of minor importance. For example, in cleaning and pickling operations the current density must be maintained between certain limits. If the current density is too low the cleaning and pickling of the strip will not be complete regardless of the speed with which the strip passes through the electrolyte. If the current density is too high damage to the strip may result and an excessive amount of power will be used.

It is therefore an object of my invention to provide a current density indicator control which is simple in construction and inexpensive to manufacture.

This and other objects will be more apparent after referring to the following specification and attached drawing, in which the single figure is a schematic view of a strip processing line with the indicator and control associated therewith.

Referring more particularly to the drawings, the reference numeral 2 indicates a tank containing an electrolyte 4. A pair of electrodes 6 and a pair of sink rolls 8 are provided in the tank below the level of the electrolyte. Strip S to be processed passes over a conductor roll 10, around sink rolls 8 between electrodes 6, and from tank 2 over an exit roll 12. Current for the electrolytic treatment in tank 2 is supplied from a generator 14. Current from the generator 14 flows through wire 16 to conductor roll 10, through the strip S, through the electrolyte 4 to the electrodes 6, and then through wire 18 to the generator 14. A shunt 20 is provided in the wire 18. An ammeter 22 may be connected across the terminals of the shunt 20 to indicate the current flow in amperes. The generator is provided with a field circuit 24 for controlling its output. A rheostat 26 having an adjustable arm 26A is provided in the field circuit for regulating the output of the generator. Power is supplied to the field circuit 24 from power source L1 and L2. The terminals of the shunt 20 are connected by means of wires 28 and 30 to the ends of a resistor 32 forming part of a potentiometer 34. Arm 36 of potentiometer 34 is connected by means of wire 38 to one side of field 40 of ammeter 42. The arm 36 passes over a scale 44 which is calibrated to indicate strip width in inches. The ammeter 42 is provided with a dial or scale 46 which is calibrated to indicate amperes per square foot. Arm 48 of ammeter 42 carries a movable contact 50. A pair of contacts 52 and 54 are arranged one on each side of the contact 50. The contacts 52 and 54 are pivotally mounted on pivots 56 and 58, respectively, so that they can be adjusted toward and away from the contact 50 when the arm 48 is in centered position. One side of field element 40 is connected to the wire 30 by means of wire 60. Arm 26A is mechanically connected to the shaft of a reversible motor 62. Motor 62 has an armature 62A and a pair of fields 64 and 66. Contact 52 is connected to field 64 by means of wire 68 and contact 54 is connected to field 66 by means of wire 70. Contact 50 is connected by means of wire 72 through a battery 74 to motor armature 62A. The motor armature 62A is electrically connected to the fields 64 and 66. A light L is connected across wires 68 and 72 and a light H is connected across wires 70 and 72.

The operation of my device is as follows.

Assuming that a strip 48 inches wide is being processed between electrodes 48 inches long and that it is desired to maintain the current density at about 150 amperes per square foot, the output from generator 14 must be 4800 amperes. Under these conditions, if the shunt 20 is rated at 5000 amperes .05 volt, the potential drop across the terminals of the shunt will be .048 volt and ammeter 22 will indicate 4800 amperes. Because the strip being processed is 48 inches wide the arm 36 will be moved to the extreme right of scale 44. In this position there will be a potential of .0048 volt across wires 38 and 60. This voltage is impressed upon field element 40 and causes meter 42 to indicate 150 amperes per square foot. If a strip of different width is being processed the arm 36 is moved to that position on scale 44 and the meter 42 will indicate the correct reading, it being understood that the output of generator 14 has been set to generate the required current for the desired current density. If desired automatic means may be provided for setting the arm 36 to correspond to the width of strip being processed.

Assuming that the current density must be maintained between 140 and 160 amperes per square foot the contacts 52 and 54 will be set so that the contact 50 will engage contact 52 when the meter 42 reads 140 amperes per square foot and will engage contact 54 when the meter reads 160 amperes per square foot. When the current density falls to 140 amperes per square foot and contacts 52 and 50 engage, current will flow from battery 74 through field 64 and armature 62A to rotate motor 62 so as to move arm 26A in a direction to increase the output from generator 14. The lamp L will also light up to indicate that the current density is too low. As the output from generator 14 is increased the pointer 48 moves up on scale 46 and causes contacts 50 and 52 to separate which deenergizes motor 62 so that it stops rotating. If the current density reaches 160 amperes per square foot contacts 54 and 50 engage, thus completing a circuit from battery 74 through armature 62A and field 66. This causes the motor 62 to operate in the opposite direction to decrease the output of generator 14. At the same time a circuit is completed through lamp H, thus indicating that the current density is too high. When the output of generator 14 is decreased, the pointer 48 moves down scale and causes contacts 50 and 54 to separate which deenergizes the motor 62 to stop its rotation.

While one embodiment of my invention has been shown and described it will be apparent that other adaptations and modifications may be made without departing from the scope of the following claims.

I claim:

1. A current density indicator and control for a continuous strip processing line for removing material from said strip in which strips of different widths pass through an electrolyte comprising a generator for supplying current to said electrolyte, a field circuit for controlling the output of said generator, a rheostat in said field circuit for regulating the output of said generator, a potentiometer having a resistor and a movable arm, means connecting the ends of said resistor to the output of said generator, said arm being movable in proportion to the width of the strip being processed, an ammeter having a field, electrical means connecting one side of said field to said arm, electrical means connecting the other side of said field to one side of said resistor, a contact for said ammeter movable in proportion to the current on said ammeter, a pair of contacts associated with said ammeter and adapted to be selectively contacted by said movable contact as the current on said ammeter reaches a predetermined high or low limit, each of said pair of contacts being mounted for adjustment toward and away from said contact, a reversible motor for moving the arm of said rheostat, a pair of fields for said motor, an electrical connection between one of said pair of contacts and one of said pair of fields, an electrical connection between the other of said pair of contacts and the other of said pair of fields, an electrical connection between the armature of said motor and each of the fields of said pair of fields, an electrical connection between said movable contact and said armature, and a power source for supplying current to said armature and one of the fields of said pair of fields when said movable contact contacts one of said pair of contacts.

2. A current density control for continuous strip processing line for removing material from said strip in which strips of different widths pass through an electrolyte comprising a generator for supplying current to said electrolyte, a field circuit for controlling the output of said generator, a rheostat in said field circuit for regulating the output of said generator, a potentiometer having a resistor and a movable arm, said arm being movable in proportion to the width of the strip being processed, means for obtaining a voltage proportional to the output current of said generator, means connecting the ends of said resistor to said last named means, an ammeter having a field, electrical means connecting one side of said field to said arm, electrical means connecting the other side of said field to one side of said resistor, a contact for said ammeter movable in proportion to the current on said ammeter, a pair of contacts associated with said ammeter and adapted to be selectively contacted by said movable contact as the current on said ammeter reaches a predetermined high or low limit, a reversible motor for moving the arm of said rheostat, a first directional circuit for said motor including said movable contact and one of said pair of contacts for moving said motor in one direction when the movable contact contacts the said one of said pair of contacts, and a second directional circuit for said motor including said movable contact and the other of said pair of contacts for moving said motor in the opposite direction when the movable contact contacts the said other of said pair of contacts.

References Cited in the file of this patent
UNITED STATES PATENTS

| | | |
|---|---|---|
| 2,325,401 | Hurlston | July 27, 1943 |
| 2,455,997 | Holman | Dec. 14, 1948 |
| 2,603,595 | Rendel | July 15, 1952 |